United States Patent [19]

Schmidt et al.

[11] 3,928,804

[45] Dec. 23, 1975

[54] ZONE SHARING TRANSPONDER CONCEPT

[75] Inventors: William George Schmidt, Rockville; Richard Sidney Cooperman, Silver Spring, both of Md.

[73] Assignee: Communications Satellite Corporation (COMSAT), Washington, D.C.

[22] Filed: Mar. 30, 1973

[21] Appl. No.: 346,388

[52] U.S. Cl. .................... 325/4; 179/15 AD; 325/3; 325/14; 325/180; 325/370; 343/100 ST; 343/100 CS; 343/178; 343/179; 343/204

[51] Int. Cl. ............................................ H04b 7/20

[58] Field of Search ............... 325/1, 3, 4, 5, 14, 15, 325/370, 154, 180; 179/15 AD; 343/100 ST, 343/100 CS, 176, 178, 179, 204

[56] References Cited

UNITED STATES PATENTS 3,095,538 6/1963 Silberstein .......................... 325/370

3,711,855 1/1973 Schmidt ........................ 343/100 ST

*Primary Examiner*—Howard W. Britton
*Assistant Examiner*—Marc E. Bookbinder
*Attorney, Agent, or Firm*—Alan J. Kasper; Jay H. Maioli; James W. Johnson, Jr.

[57] ABSTRACT

A communications satellite system with an on-board switching matrix and transponder sharing. A plurality of receive spotbeam antennas are selectively connected to a plurality of transmit spotbeam antennas by an on-board microwave switching matrix under control of a distribution control unit. Several of the receive spotbeam antennas are connected to a common receiver by an on-board input switch. Corresponding transmit spotbeam antennas are connected to a common transmitter by an on-board output switch. Auxiliary switch control logic synchronizes the input and output switch with the satellite switching matrix.

7 Claims, 7 Drawing Figures

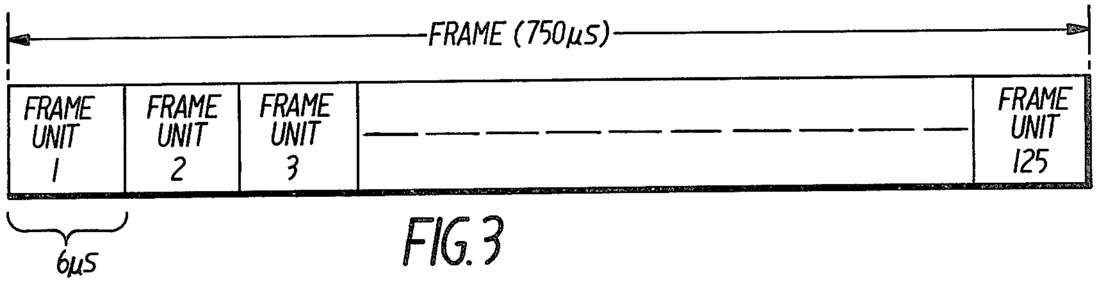
FIG. 3
FIG. 4 SATELLITE MATRIX CONTROL WORD
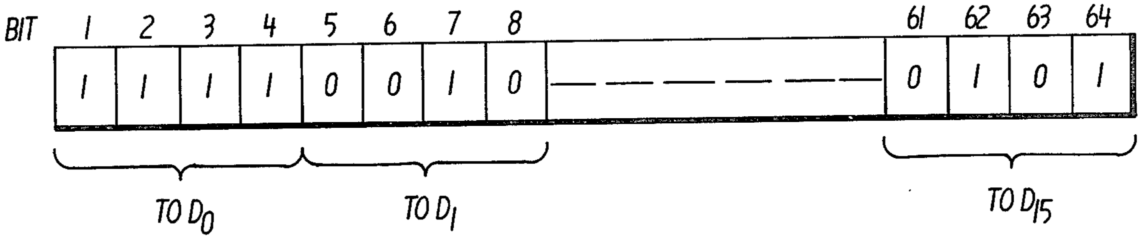
FIG. 5 AUXILIARY SWITCH LOGIC CONTROL WORD FIG. 6 SATELLITE SWITCHING MATRIX FIG. 7
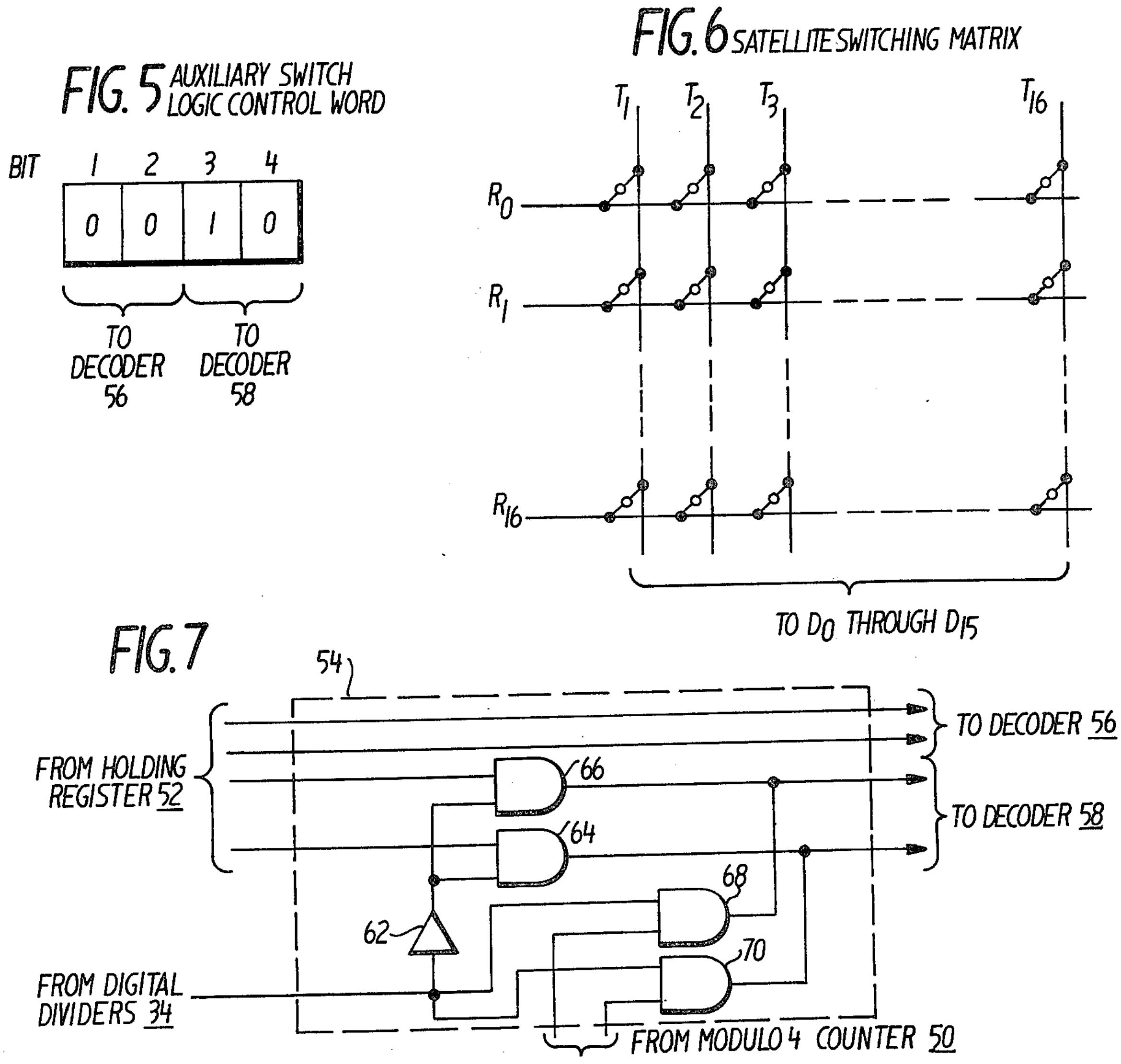

ZONE SHARING TRANSPONDER CONCEPT

BACKGROUND OF THE INVENTION

1. Field of the Invention

This invention relates generally to relay-type communications satellites, and more particularly to a time division multiple access/space division multiple access (TDMA/SDMA) system which utilizes directional spotbeam antennae, an on-board switching matrix and transponder sharing techniques.

2. DESCRIPTION OF THE PRIOR ART

Conventional space division multiple access (SDMA) communication satellites employ multiple transmit/receive directional spotbeam antennas. In prior art TDMA/SDMA systems, several earth stations within a limited geographical zone sequentially access the same spotbeam antenna in a time divided manner. Typically, each such antenna communicates with a different geographical zone on the earth's surface. In one prior art system disclosed in U.S. Pat. application Ser. No. 866,554 now U.S. Pat. No. 3,711,855 (entitled "Satellite On-Board Switching" filed by Schmidt et al. on Oct. 15, 1969 and assigned to the assignee of this invention) the satellite contains a switching matrix which interconnects antennas into pairs for specified intervals and according to a preestablished sequence so that information may flow from a transmitting earth station in view of one antenna to a receiving earth station in view of another antenna. In such systems, each transmit/receive antenna on-board the satellite has its own dedicated transponder which comprises a separate transmitter and receiver. In order to allow interchangability of antennae and thereby provide redundancy, it has been the practice to use identical transponders for each antenna on board the satellite. Because of this interchangability the transponders used must have sufficient bandwidth to handle the traffic of the busiest zone.

These systems suffer from several disadvantages. First the use of a dedicated transponder for each antenna significantly increases the weight of the satellite. In addition, because the traffic patterns of different earth zones vary considerably but identical high capacity transponders are used for both low traffic and heavy traffic zones, the transponders for the low traffic zones operate at a fraction of their capacity.

SUMMARY OF THE INVENTION

It is an object of the present invention to provide multiplexing circuitry which allows several spotbeam antennas to share the same transponder. In accordance with this invention, several satellite transmit spotbeam antennas communicating with different earth zones are connected to a low power multiple position switch. The low power switch alternately and selectively connects individual receive antennas to the low level receiver portion of a conventional transponder. The output of the low level receiver is connected to a satellite switching matrix. The low power switch is synchronized with the satellite switching matrix so that each satellite receive antenna is connected to the low level receiver at the time designated for the reception of signals from the earth zone in communication with that antenna. Synchronization of the low power switch is controlled by an auxiliary switch control unit on-board the satellite which receives synchronizing information from the satellite synchronizing clock. The output signals from the satellite switching matrix are fed to the high power transmitter portion of the conventional transponder. The output of the transmitter is connected to a high power switch which alternately and selectively connects the transmitter output to each of several transmit spotbeam antennas. The high power switch is also synchronized with the satellite switching matrix so that each satellite transmit antenna is connected to the shared transmitter at the time designated for the earth zone in communication with that transmit antenna to receive. Synchronization of the high power switch is controlled by the auxiliary switch control unit. The satellite may contain a number of such shared transponder systems. Each system is appropriately synchronized with the satellite switching matrix by the auxiliary switch control unit.

BRIEF DESCRIPTION OF THE DRAWINGS

FIG. 3 illustrates the format of the signal received at the satellite switching matrix of the system shown in FIG. 1.

FIG. 4 illustrates the format of the control word stored in the Distribution Control Unit Holding register shown in FIG. 2.

FIG. 5 illustrates the format of the control word stored in the auxiliary switch control unit holding register shown in FIG. 2.

FIG. 6 is a schematic diagram of a satellite switching matrix constructed in accordance with the present invention.

FIG. 7 illustrates in greater detail the logic gate shown in FIG. 2.

DESCRIPTION OF THE PREFERRED EMBODIMENT

Figure 1:
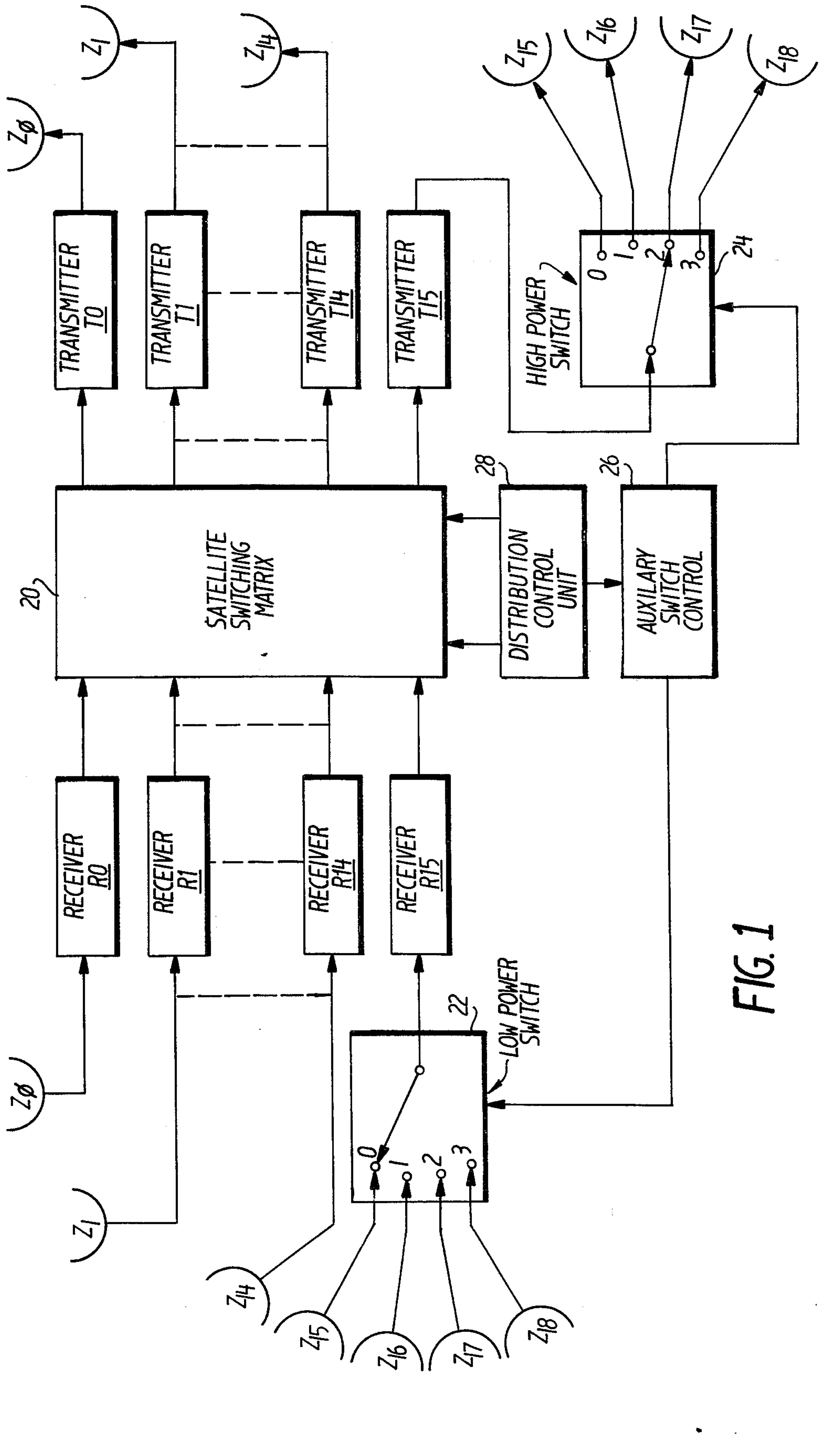
FIG. 1 is a block diagram of the equipment onboard the satellite in a communications system employing on-board satellite switching and transponder sharing.

Referring to FIG. 1, a block diagram of a TDMA/SDMA communications subsystem is shown, including directional transmit/receive antennas $Z_0$–$Z_{18}$ for communicating with geographically discrete zones on the earth's surface, which employs on-board satellite switching and transponder sharing. Although nineteen earth station zones and associated transmit/receive antennas have been disclosed in the preferred embodiment other numbers of earth station zones and associated directional antennae may be part of the system in accordance with the teachings of the present invention. The antennas shown are of the directional spotbeam type, as is known in the art, which may be configured to transmit or receive. For convenience they have been shown in the drawings as separate transmit and receive antennae with identical numerical designation. Although in the preferred embodiment illustrated in FIG. 1 a single antenna has been shown for both transmit and receive, separate antennas may also be used.

The satellite communications subsystem contains a switching matrix 20 which is connected to receive signals from the receive antennas $Z_0$ thru $Z_{18}$. Each receive antenna is oriented to receive signals transmitted by earth stations located in an associated earth station zone. Each receive antenna $Z_0$ thru $Z_{14}$ is connected directly to a respective dedicated receiver $R_0$ thru $R_{14}$.

The receive antennas $Z_{15}$ thru $Z_{18}$ share the same receiver $R_{15}$. Each of the receive antennas $Z_{15}$ thru $Z_{18}$ is connected to a separate terminal 0 thru 3 respectively of a low power switch 22. The input of the receiver $R_{15}$ is alternately and selectively connected to each of the antennas $Z_{15}$ thru $Z_{18}$ by the low power switch 22. Typically, the low power switch 22 would be a single pole four, throw (SP4T) microwave switch.

Two types of well known microwave switches, the semiconductor diode (PiN) switch and the magnetic latching switch have the switching speed ($<1\mu$sec) and insertion loss (<2db) necessary for low power switch 22. As between these two switches, semiconductor diode switches are preferred because of their desirable weight and speed characteristics. While semiconductor diode or magnetic latching are the preferred switches for use in low power switch 22, any suitable switch possessing the desired characteristics may be used.

The switch 22 is under control auxiliary switch control logic 26. The auxiliary switch control 26 receives synchronizing information from the distribution control unit 28 and uses the information to control the switch connections of the low power switch 22 and the duration of those connections such that each of the input antennas $Z_{15}$ thru $Z_{18}$ is connected to the low level receiver $R_{15}$ at the time and for the duration designated for the earth zone serviced by that antenna to transmit. A description of this connection function is presented below.

Signals from the respective receivers $R_O$ thru $R_{15}$ are input to the satellite switching matrix 20, where under control of the distribution control unit 28 they are connected to the appropriate transmitter $T_O$ thru $T_{15}$.

The satellite switching matrix 20 is illustrated in FIG. 6 and consists of a 16 × 16 array of microwave switches with their associated drivers. The matrix provides the desired cross connection between the 16 receivers $R_O$ $R_{15}$ and the 16 transmitters $T_O$ thru $T_{15}$. Thus, a total of 256 possible cross-connection may be made. The sequence and duration of connection of the inputs and outputs of the satellite switching matrix 20 is programmable by the distribution control unit 28. The dynamic switching of the satellite switching matrix is divided into repetitive frame intervals of approximately 750 $\mu$sec in duration. A typical frame is illustrated in FIG. 3. Each frame interval is further divided into 125 time intervals, termed frame units. A frame unit is the shortest programmable increment of time to be allocated to any particular cross-connection of the satellite switching matrix and is equal to approximately 6 $\mu$sec. The number of frame units allocated to any particular cross-connection by the satellite switching matrix 20 is under control of the distribution control unit 28. One hundred and twenty-four frame units in every frame are allotted for communication. The remaining single frame unit in every frame is allocated for transmission of synchronization signals for terrestrial equipment synchronization as well known in the art. A technique and apparatus which may be used in the present system for synchronization of terrestrial equipment is disclosed in the aforementioned Schmidt et al application.

The outputs of transmitters $T_O$ thru $T_{14}$ are directly connected to their respective dedicated transmit antennas $Z_O$ thru $Z_{14}$. Transmit antennas $Z_{15}$ thru $Z_{18}$ are connected to a separate output terminal 0 thru 3 respectively of the high power switch 24. The output of transmitter $T_{15}$ is alternately and selectively connected to each of the transmit antenna $Z_{15}$ thru $Z_{18}$ by the high power switch 24. The high power switch 24 is a single pole four throw microwave switch. Both semiconductor diode (PiN) or magnetic latching switches have been found to possess the necessary switching speeds, maximum insertion loss and current capacity to be used for high power switch 24. As between these two switches, magnetic latching switches are preferred because of their greater power handling capability. While magnetic latching or semiconductor diode switches are preferred, any suitable switch possessing the desired characteristics may be used in high power switch 24.

The high power switch is controlled by the auxiliary switch control 26. The auxiliary switch control uses the synchronizing signals received from the distribution control unit 28 to control which antenna is connected to the transmitter $T_{15}$ by high power switch 24 and the duration of that connection such that each of the output antenna $Z_{15}$ thru $Z_{18}$ is connected to the transmitter $T_{15}$ at the time and for the duration designated for the earth zone serviced by that antenna to receive.

Figure 2:
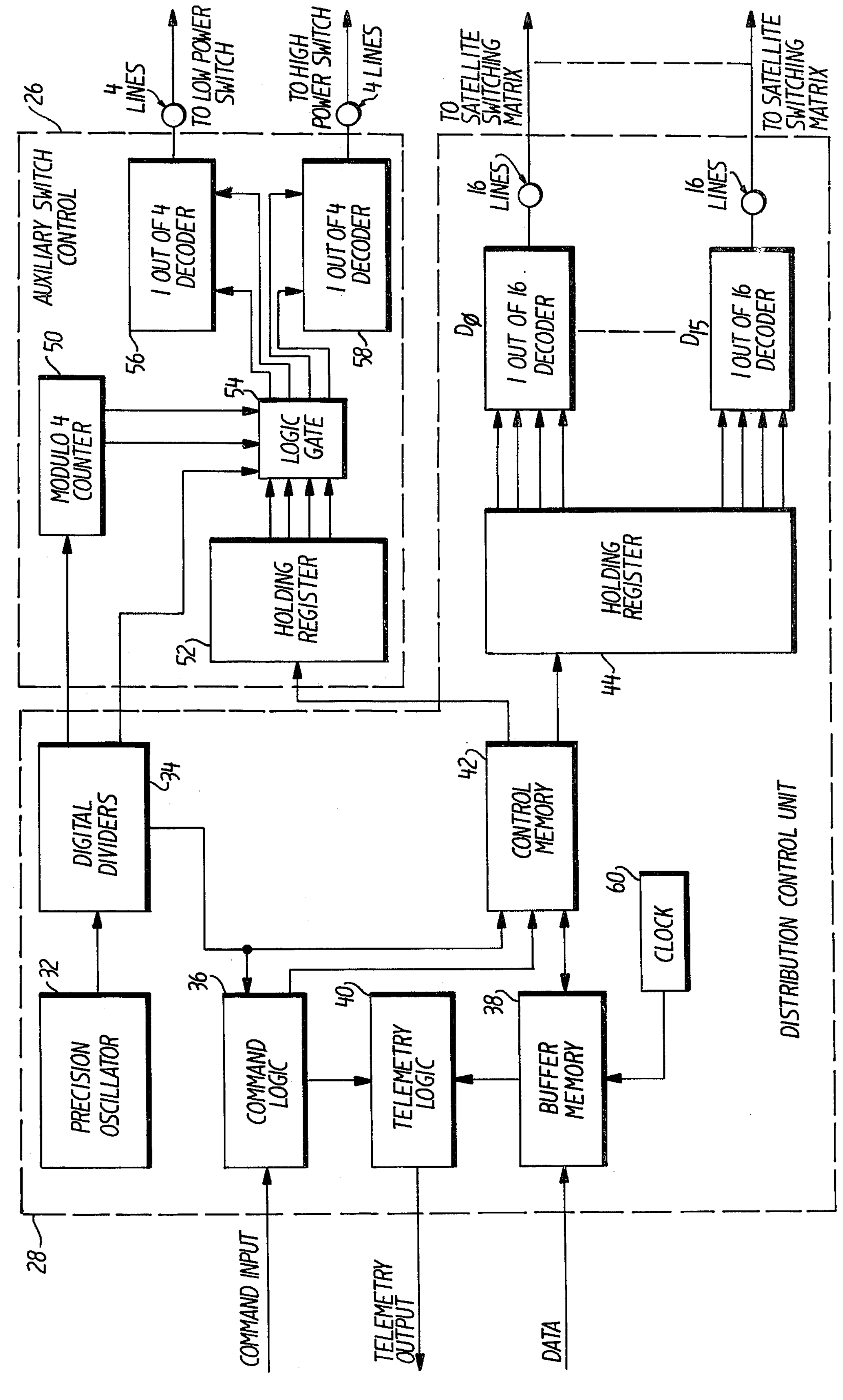
FIG. 2 is a schematic block diagram of the distribution control unit and auxiliary control unit of FIG. 1.

FIG. 2 shows a block diagram of the distribution control unit 28 and the auxiliary switch control 26. Data on traffic flow, used by the distribution control unit to allocate frame units between the 256 possible cross-connections of satellite switching matrix 20, is stored in a control memory 42. The date is stored as a 64 bit digital word. This data may be altered to adapt to changes in traffic flow patterns in response to command inputs from ground control received by the command logic 36. The replacement data is read into Buffer memory 38, verified and transferred to control memory 42. Control memory 42 may be any memory device well known in the art capable of storing and parallel accessing a 64 bit digital word. Suitable memory devices are disclosed in U.S. Pat. No. 3,548,108.

Telemetry logic 40 provides for terrestrial monitoring of the contents of control memory 42. Upon receipt of a command from ground control, command logic 36 signals control memory 42 to transfer its current contents to buffer memory 38 from which it is serially transmitted via a separate radio frequency link (not shown) to ground control under control of telemetry logic 40 and clock 60. Clock 60, buffer memory 38, command logic 36 and telemetry logic 40 form part of the command and control telemetry link for the spacecraft. Such telemetry systems, well known in the art, permit control of spacecraft operations to be directed from a terrestrial control facility. Suitable telemetry systems which may be used for this purpose are disclosed in U.S. Pat. No. 3,548,108.

A high-stability crystal oscillator 32 in conjunction with digital dividers 34 provides a central timing reference for the communications system. This internal clock provides the synchronizing signals for the terrestrial stations, controls the timing of the satellite switching matrix 20 and controls the timing of the auxiliary switch control 26.

The control memory 42 stores the output connection to be made for each of the 16 inputs to the satellite switching matrix for each of the 124 frame units in a frame that are allotted for communication. In addition, the control memory 42 stores the switch connections to be made for the low power switch 22 and for the high power switch 24 for each of the 124 frame units. At the start of every frame, data is output from the control memory 42 to a holding register 44, at the rate of one 64 bit word every frame unit (6 usec). A typical control word is shown in FIG. 4. The data word in the holding register 44 is then parallel accessed in 16 groups of 4 bits each by sixteen 1 out of 16 decoders $D_0$ thru $D_{15}$. There is a 1 out of 16 decoder corresponding to each of the 16 inputs. Thus $D_0$ through $D_{15}$ correspond to $R_0$ thru $R_{15}$ respectively.

The output of the 1 out of 16 decoder is applied to the satellite switching matrix 20 and determines which of the sixteen outputs of the satellite switching matrix will be connected to the input corresponding to that decoder. For example, if at the start of any frame unit the contents of the holding register 44 is as shown in FIG. 4 then $D_0$ will decode a 15 and energize the junction of $R_0$ and $T_{15}$ in the satellite switching matrix to connect $R_0$ to $T_{15}$ for the duration of that frame unit; $D_1$ will decode a 2 and energize the junction of $R_1$ and $T_2$ for the duration of that frame unit and $D_{15}$ will decode a 5 to energize the junction of $R_{15}$ and $T_5$ for the duration of that frame unit. Similar connections will be made as a result of decoders $D_3$ thru $D_{14}$. At the start of a new frame unit a new control word will be read into holding register 44 and the process repeated.

In system operation, the control memory 42 outputs one hundred twenty-four 64 bit data words, one every frame unit. No data transfer is made from the control mempry 42 to the holding register 44 during the 125th frame allotted for transmission of terrestrial synchronization signals. At the end of the 125th frame, the control memory repeats it readout of one hundred twenty-four 64 bit data words. This process is repeated continuously during system operation.

In addition to the output connections for the satellite switching matrix 20, the control memory 42 stores the switch connections to be made for the low power switch 22 and for the high power switch 24 for each of the 124 frame units allotted for communication. At the start of every frame and synchronous with the data transfer to holding register 44 the control memory 42 transfers data to holding register 52 at the rate of one four bit word every frame unit (6 μsec). The data word in the holding register 52 is then parallel accessed in two groups of two bits each by two one out of four decoders 56 and 58. Decoder 56 is used to control the low power switch 22, while decoder 58 is used to control the high power switch 24. The output of the one out of four decoders determine which of the four terminals of the associated switch is active. For example, if at the start of any frame unit the contents of the Holding Register 52 is as shown in FIG. 5, then Decoder 56 will decode a zero and connect the output of low power switch 22 to antenna $Z_{15}$ for the duration of that frame unit as shown in FIG. 1. Decoder 58 will decode a 2 and connect the input of high power switch 24 to antenna $Z_{17}$ for the duration of that frame unit as shown in FIG. 1. At the start of a new frame unit a new control word will be read into holding register 44 and the process repeated. In system operation, the control memory 42 outputs one hundred twenty-four 4 bit data words to holding register 52, one every frame unit, synchronous with the data transfer from the control memory 42 to holding register 44.

No data transfer is made from the control memory 42 to the holding register 52 during the 125th frame which is reserved for transmission of terrestrial synchronization signals. The data input to the decoder 58 during the 125th frame is derived from the modulo-4 counter 50. Thus at the start of the 125th frame, logic gate 54 directs the output of modulo 4 counter 50 to the input of decoder 58. The modulor 4 counter in response to synchronization signals received from digital dividers 34 is advanced one count each frame causing the output of decoder 58 to repeat every four frames. A more detailed diagram of logic gate 54 is shown in FIG. 7. The first two bit positions of holding register 52 are transfered directly to decoder 56. The other two bit positions of holding register 52 are applied to normally open AND gates 66 AND 64 respectively. The two inputs from modulo 4 counter 50 are connected to normally closed AND gates 68 and 70 respectively. Digital dividers 34 provide a 6 μs gating pulse to logic gate 34 at the start of the 125th frame unit of each frame. The gating pulse is applied through an inverter 62 to the inputs of normally open AND gates 64 and 66 and applied directly to the inputs of normally closed AND gates 68 and 70. In operation at the start of the 125th frame unit the gating pulse applied to normally closed AND gates 68 and 70 causes these gates to open thereby allowing the output of modulo 4 counter 50 to be applied to decoder 58. The inverted gating pulse is applied to normally open AND gates 66 and 64 causing these gates to close thereby inhibiting transfer of data from holding register 52 to Decoder 58. At the end of the 125th frame unit the gating pulse is removed causing AND gates 68 and 70 to close and AND gates 64 and 66 to open.

At the beginning of the 125th frame unit digital Dividers 34 apply a pulse to the input of modulo 4 counter 50 causing the count to be advanced by one, such that at the beginning of each 125th frame unit the count decoded by decoder 58 will correspond to the next sequential transmit antenna connected to high power switch 22. Thus, in four consecutive frames high power switch 22 will successively connect each of the antenna $Z_{15}$ thru $Z_{18}$ to the transmitter $T_{15}$ during the 125th frame unit at the rate of one antenna per frame. After four consecutive frames, the sequence of connections is repeated. Thus, the earth station zones corresponding to output antennas $Z_{15}$ thru $Z_{18}$ will each receive synchronizing signals once every 4 frames instead of the once per frame frequency of the earth station zones corresponding to antennas $Z_1$ thru $Z_{14}$.

What is claimed is:

1. An improved Space Division Multiple Access-Time Division Multiple Access Communications satellite system of the type which includes a switching matrix on-board the satellite for selectively interconnecting a plurality of communications receivers, each receiving incoming signals from a separate spotbeam antenna in view of its associated discrete geographical zone, to a plurality of transmitters each transmitting outgoing signals through a separate antenna in view of its associated discrete geographical zone, according to a predefined sequence, wherein the improvement comprises:

a. input switching means on-board the satellite for alternately connecting a plurality of receive spotbeam antennas to a common receiver thereby enabling said receive antennas to share the same receiver;

b. output switching means on-board the satellite for alternately connecting a plurality of transmit spotbeam antennas to a common transmitter thereby enabling said transmit antennas to share the same transmitter;

c. a holding register on board the satellite having a capacity for storing and outputting an input code word corresponding to said input switching means and capacity for storing and outputting an output code word corresponding to said output switching means;

d. timing control means on-board the satellite for producing pulsed timing signals on a periodic basis, each period representing a satellite time frame, said timing signals being for synchronizing said input switch and said output switch with said switching matrix;

e. first decoding means on-board the satellite connected to receive said input code words outputted from said holding register and connected to said input switching means for decoding said input code word and causing the switch connection made by said input switching means to change in response to a change in said input code word; and f. second decoding means on-board the satellite connected to receive said output code words outputted from said holding register and connected to said output switching means for decoding said output code word and causing the switch connections made by said output switching means to change in response to a change in said output code word.

2. A communications satellite system as claimed in claim 1 further comprising:

a. memory means for storing a plurality of said input code words and said output code words for transferring said input and output code words to said holding register in response to said pulsed timing signals from said timing control means.

3. A communications satellite system as claimed in claim 2 further comprising counting and logic means responsive to said pulsed timing signals from said timing control means and connected between said holding register and said output decoding means for causing terrestrial synchronizing signals to be alternately transmitted by each of said plurality of transmit spotbeam antennas.

4. A communications satellite system as claimed in claim 3 wherein said counting and logic means comprises:

a. counter means for counting transmission frames in response to pulsed timing signals from said timing control means; and b. logic gate means for alternately gating the count of said counter means and said output code word from said holding register to said second decoding means in response to pulsed timing signals from said timing control means whereby the switch connection made by said output switching means during the time when said output switching means is connected to said counting means is determined by the count in said counting means.

5. A communications satellite system as claimed in claim 4 wherein said input switching means comprises a plurality of diode switches.

6. A communications satellite system as claimed in claim 5 wherein said output switching means comprises a plurality of magnetic switches.

7. An improved Space Division Multiple Access Communications satellite system of the type which includes a switching matrix on-board the satellite for selectively interconnecting a plurality of communications receivers each receiving incoming signals from a separate spotbeam antenna in view of its associated discrete geographical zone to a plurality of transmitters each transmitting outgoing signals through a separate spotbeam antenna in view of its associated discrete geographical zone according to a predefined sequence wherein the improvement comprises:

a. a plurality of input switching means on-board the satellite, each of said input switching means alternately connecting an associated group of receive spotbeam antennas to a receiver associated with said input switching means thereby enabling each group of receive spotbeam antennas associated with an input switching means to share the receiver associated with that same input switching means;

b. a plurality of output switching means on-board the satellite, each of said output switching means alternately connecting an associated group of transmit spot-beam antennas to a transmitter associated with said output switching means thereby enabling each group of transmit antennas associated with an output switching means to share the transmitter associated with that same output switching means;

c. local switch control and transmission synchronizing signal means connected to each of said input switching means and to each of said output switching means for synchronizing said input switching means and said output switching means with said switching matrix and further including counting and logic means for causing terrestrial synchronizing signals to be tranmitted by each of said plurality of transmit spotbeam antennas.

* * * * *